July 23, 1968  T. R. STOCKTON  3,393,581
INERTIA LOCKING DIFFERENTIAL AND DISC BRAKE CONSTRUCTION
Filed April 21, 1967  2 Sheets-Sheet 2

THOMAS R. STOCKTON,
INVENTOR

BY
ATTORNEYS

# United States Patent Office 3,393,581
Patented July 23, 1968

3,393,581
INERTIA LOCKING DIFFERENTIAL AND DISC BRAKE CONSTRUCTION
Thomas R. Stockton, Ann Arbor, Mich., assignor to Ford Motor Company, Dearborn, Mich., a corporation of Delaware
Filed Apr. 21, 1967, Ser. No. 632,649
7 Claims. (Cl. 74—710.5)

ABSTRACT OF THE DISCLOSURE

This specification discloses a differential gear assembly comprising a power input shaft and bevel gearing arranged to distribute input shaft torque to each of two transversely disposed axle shafts. An inertia disc situated partly within the differential carrier housing is formed with gear teeth that mesh alternately with the teeth of the differential pinions so that the disc will oscillate upon rotation of the pinions with respect to the carrier housing. This introduces a torque bias that provides torque distribution to each axle shaft regardless of the relative magnitudes of the loads applied to the shaft.

An external portion of the inertia disc defines a friction brake disc for a disc brake assembly. The brake disc forms a portion of the inertia mass of the inertia disc.

Brief description of the invention

My invention relates to automotive vehicle drivelines for distributing driving torque from an engine to each of two traction wheels. It relates particularly to improvements in a differential gear mechanism adapted to deliver driving torque from an engine driven driveshaft to transversely disposed axle shafts connected to traction wheels.

My invention includes structure that is well known in the art, including a differential carrier journaled rotatably on a relatively stationary housing of a differential-axle assembly. The carrier supports a ring gear that rotates with the housing about the axis of two axle shafts extending through the carrier. Each axle shaft is connected within the carrier to a separate differential side gear. Each side gear in turn meshes with a pair of differential pinions that are journaled rotatably on a differential carrier.

If the loads on the axle shafts are balanced, balanced torque delivery paths will be established through the differential gearing. In such conventional mechanisms, loss of traction at one wheel will result in uncontrolled spinning of that wheel as the other wheel remains stationary. It is impossible under such conditions to establish an effective torque delivery path to the road wheels. Attempts therefore have been made to introduce into the differential gearing a clutch structure for inhibiting relative movement of the gear elements, such as the side gears, with respect to the carrier. This will permit torque distribution to the traction wheel with a higher co-efficient of friction with respect to the road surface regardless of loss of traction at the other wheel.

The improvement of my invention makes it possible to establish a torque bias without the use of clutch devices of the type found in conventional systems. It includes features that are common to my co-pending application Ser. No. 634,210, filed Apr. 27, 1967, which also discloses an inertia disc located within a differential carrier housing. The inertia disc of that disclosure, as well as that of my instant improvement, includes gear teeth that engage the teeth of the differential pinions so that one pinion tooth will mesh with a first tooth on the disc as the other is moved out of engagement. Upon further angular displacement of the differential pinion with respect to the carrier housing, the other tooth will mesh with its companion pinion tooth as the first tooth becomes disengaged from its pinion. This establishes an oscillating motion of the inertia disc which develops a torque bias due to the inertia forces.

My present improvement, like that of my earlier disclosure, utilizes inertia forces for introducing a torque bias but the inertia mass of the inertia disc of this disclosure is located at a radially outward location on the exterior of the carrier housing. This makes it possible to introduce a greater torque bias in the system than that which could be obtained with a relatively reduced diameter disc. In addition the inertia mass defines a brake disc for a disc brake assembly. This will improve the braking characteristics of the vehicle under those circumstances in which one traction wheel is located on a slippery road surface and the other traction wheel is located on a road surface of relatively high frictional coefficient.

I am aware of various brake disc constructions in environments of this type where the brake structure is used to anchor the carrier housing to the relatively stationary differential housing. This will introduce a braking effort, but the braking effort is reliable only in those circumstances in which the traction of one wheel will be approximately equal to the traction of the other. The degree of braking effort in such circumstances is dependent upon the tractive effort that can be obtained with the wheel having the lowest coefficient of friction.

It is an object of my invention to overcome the foregoing shortcoming in conventional differential brake systems by providing a combined inertia disc and brake disc construction that will permit a transfer of braking torque to the stationary housing from the traction wheel having the highest coefficient of friction as well as from the other traction wheel.

It is another object of my invention to provide a differential construction of the type above set forth wherein the brake disc is used as an inertia mass to introduce a torque bias in the differential system when the brake disc is not operational.

Particular description of the invention

Figure 1:
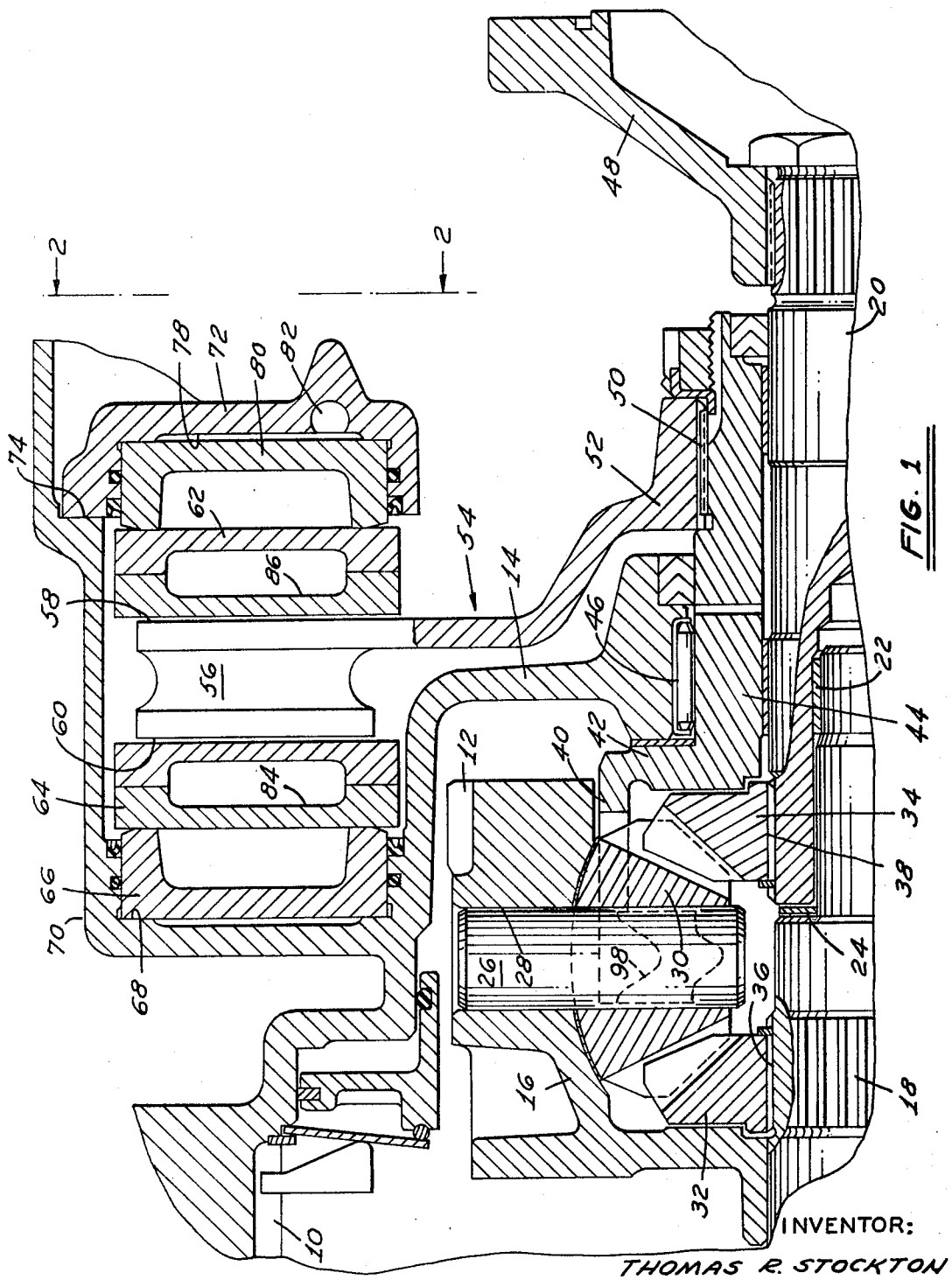
FIGURE 1 shows in longitudinal cross-sectional form a differential gear mechanism embodying the improvements of my invention.

In FIGURE 1 numeral 10 designates a relatively stationary housing for a multiple ratio power transmission mechanism, the power input element of which is connected to the crankshaft of an internal combustion engine. It includes multiple gearing elements that define plural torque delivery paths between the engine and a power output gear, not shown. The output gear engages drivably a differential ring gear 12. The housing 10 includes a differential housing extension 14 which encloses a differential gear assembly.

The differential gear assembly comprises a differential carrier 16 mounted for rotation with the ring gear 12. The axis of rotation corresponds to the axis of axle shaft 18. A second axle shaft 20 is coaxially aligned with shaft 18. The shafts are journaled with respect to each other by means of bushing 22 located between telescoping parts of the shafts. End thrust on one shaft is distributed to the other through a thrust washer 24.

A differential pinion shaft 26, which is one of a pair, is received within an opening 28 formed in the carrier 16. It journals rotatably a differential bevel pinion 30. A corresponding pinion and shaft are located 180° out of position with respect to the shaft 26 and pinion 30.

Pinion 30 engages a pair of differential bevel side gears 32 and 34. Gear 32 is splined at 36 to the shaft 18 and gear 34 is splined at 38 to the shaft 20.

Located within the carrier 16 is an inertia disc 40 which surrounds the axis of shaft 18.

Inertia disc 40 includes a radially inwardly extending web 42 which is joined to an axially extending sleeve shaft 44. This sleeve shaft is journaled by bearings 46 within a bearing opening formed in the hub of differential housing portion 14. Sleeve 44 surrounds shaft 20. The outboard end of shaft 20 can be splined to a drive flange 48 which in turn can be connected to the traction wheels through a suitable universal joint and driveshaft assembly, not shown.

Sleeve shaft 44 is splined at 50 to the hub 52 of a brake disc 54. The periphery of the brake disc carries an inertia mass 56. Friction brake surfaces 58 and 60 on the mass 56 are disposed adjacent pressure plates 62 and 64. Plate 64 in turn is engaged by a spot brake piston of cylindrical form as shown at 66. It is received within a cylindrical cylinder 68 formed in a brake housing 70. This housing may form a part of transmission housing 10. The piston 66 and the cylinder 68 cooperate to define a pressure chamber. Fluid pressure can be admitted to the chamber to apply a brake engaging force to the pressure plate 64 thereby causing it to frictionally engage the surface 60.

Figure 2:
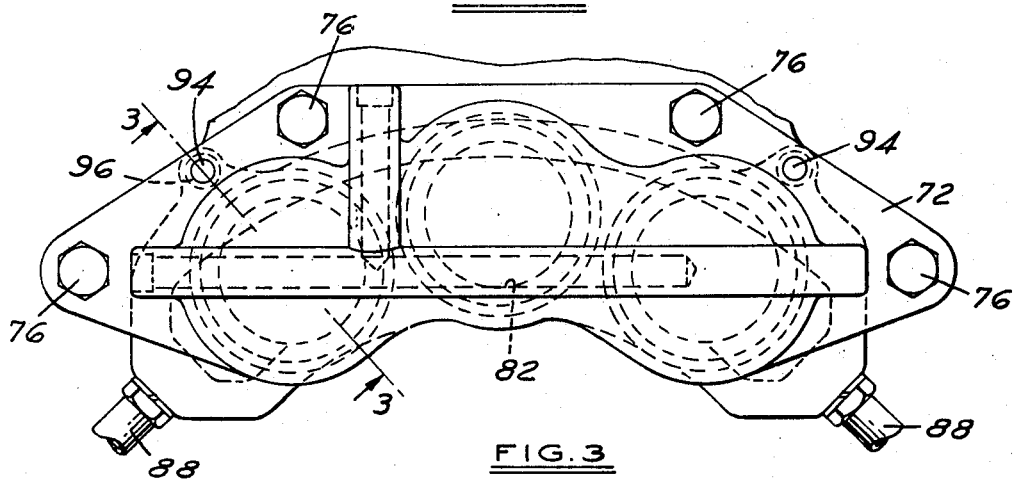
FIGURE 2 is a side view of the structure of FIGURE 1 taken along the plane of section line 2—2 of FIGURE 1.

A cylinder plate 72 is bolted to an internal shoulder 74 formed in the housing 70, bolts 76 being provided for this purpose. A cylinder 78 is formed in the plate 72. It receives a circular piston 80 which cooperates with the cylinder 78 to define a pressure chamber. Fluid pressure can be admitted to the chamber through a pressure passage 82. Piston 80 is adapted to apply a braking pressure to pressure plate 62 which causes the latter to frictionally engage friction surface 58. As seen in FIGURE 2, three such pairs of pistons 80 may be provided. In a similar fashion, three pistons 66 in cylinder 68 may be formed in the housing 70.

Pressure plates 64 and 62 are formed with internal passages 84 and 86, respectively, which receive liquid brake coolant such as water. An inlet passage for the water is shown in FIGURE 2 at 88. It can be connected by means of a suitable fluid fitting with internal passages 84 and 86. A similar passage, not shown, can be provided to accommodate return flow from the pressure plates.

Figure 3:
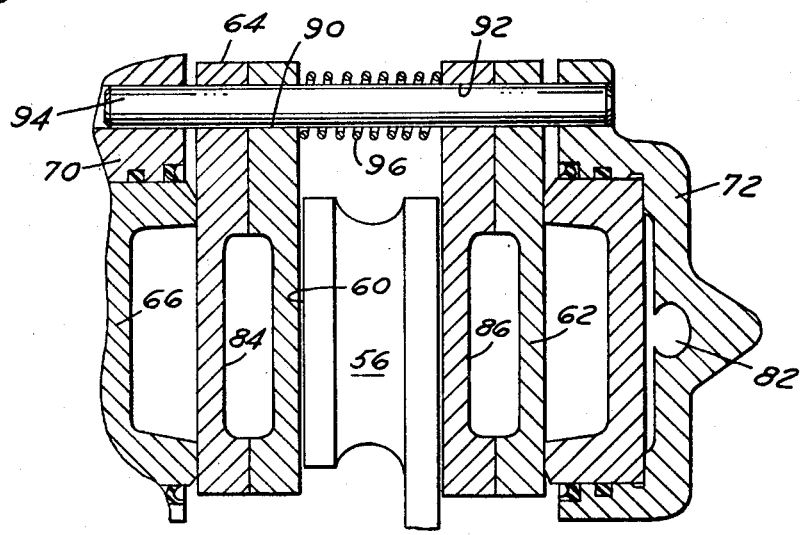
FIGURE 3 is a cross-sectional view taken along the plane of section line 3—3 of FIGURE 2.

As seen in FIGURE 3, pressure plates 64 and 62 can be formed with pilot openings 90 and 92 which receive a pilot pin 94. The ends of the pin 94 are supported in turn in openings formed in the plate 72 and in the housing 70. A piston return spring 96 is situated between the pressure plates as indicated to urge normally the pistons to a brake releasing position.

Figure 4:
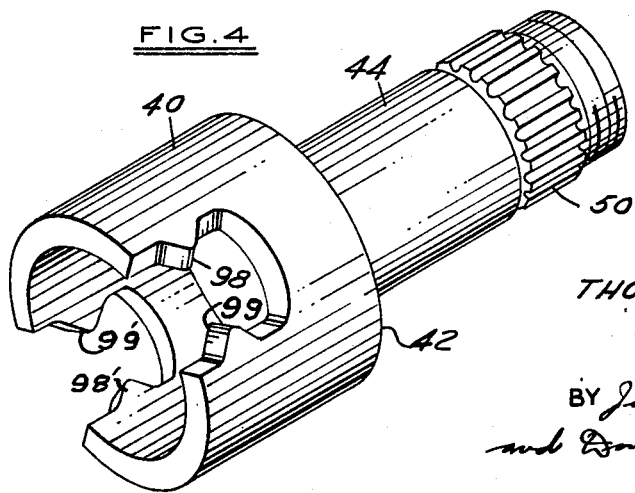
FIGURE 4 is a detail view of the inertia disc of FIGURE 1.

The inertia disc 40 is formed with two internal gear teeth on its inner periphery, which is shown in FIGURE 4 at 98 and 99. A corresponding pair of gear teeth is formed 180° out of position with respect to the gear teeth 98 and 99 as seen at 98' and 99'. The pinions 30 are formed with an odd number of teeth. These are adapted to register with the teeth formed in the inertia disc. Thus, when teeth 98 and 98' are moved into mesh with a cooperating pinion tooth, the companion teeth 99 and 99' move out of mesh with the pinion teeth. Upon continued rotation of the pinions 30, a converse action takes place. Thus the pinion teeth of pinion 30 will move out of mesh with the disc teeth 98 and 98' while the other pinion teeth will move into mesh with the companion teeth 99 and 99' of the inertia disc. The inertia disc then will be caused to oscillate about the axis of the shaft 18 whenever relative motion exists between pinions 30 and the differential carrier 16. This oscillating motion, of course, is transferred through the sleeve shaft 44 to the brake disc 54.

The oscillating motion on the disc 54 creates inertia forces that produce a troque bias in the differential gearing. The moment of inertia of the disc is augmented, of course, by the radially outward location of the inertia mass.

To effect a braking action, it is merely necessary to apply fluid pressure to the brake cylinders thereby causing the water cooled pressure plates to engage the friction discs. The braking action thus established locks together the two axle shafts so that they are braked together. The degree of braking effort, therefore, is not reduced unduly when one wheel rests on slippery pavement as the brake is applied. The brake locks together the output of the torque shafts of the two wheels for rotation in unison.

Having thus described a preferred embodiment of my invention, what I claim and desire to secure by U.S. Letters Patent is:

1. A differential brake assembly comprising a pair of axle shafts mounted for rotation about a first axis, a power input shaft mounted for rotation about an axis transverse to said first axis, a differential carrier mounted for rotation about said first axis, a differential housing surrounding said differential carrier and rotatably supporting the same, a geared connection between said input shaft and said differential carrier whereby the latter is caused to rotate about the axis of said output shafts, a pair of differential side gears within said carrier housing, one side gear being connected to one output shaft and the other side gear being connected to the other output shaft, a pair of differential pinions in said differential carrier engageable with said differential side gears, an inertia disc in said housing having at least two gear teeth, one disc tooth engaging one pinion and the other disc tooth engaging the other pinion, the teeth of said disc being out of phase with respect to each other whereby one gear tooth of said disc moves into mesh with its associated pinion as the other gear tooth thereof moves out of engagement with respect to its associated pinion upon relative rotation of said pinions with respect to said carrier, said inertia disc oscillating about the axis of said output shafts as one output shafts rotates relative to the other, a sleeve shaft rotatably journaled about said first axis and connected to said inertia disc for rotation in unison therewith, and an inertia mass secured to said sleeve shaft externally of the differential carrier thereby introducing an augmented inertia force to create a torque bias upon movement of one output shaft with respect to the other.

2. The combination set forth in claim 1 wherein said inertia mass is in the form of a disc having a radially extending portion and a peripheral portion, said peripheral portion having a relatively large mass to create augmented inertia forces.

3. The combination set forth in claim 2 wherein said radially extending disc portion defines a brake disc with friction surfaces situated on at least one side thereof, a brake servo comprising a cylinder carried by said differential housing, a piston in said housing, and means for introducing fluid pressure behind said piston, said piston being adapted to apply a brake engaging force to the friction surface of said disc.

4. The combination set forth in claim 2 wherein said radially extending disc is in the form of a brake disc having externally situated friction surfaces, a pair of brake servos each comprising a braking piston situated on the opposite side of said disc, a pair of cylinders carried by said differential housing, one piston being received within each cylinder, and means for introducing fluid pressure to said cylinders thereby creating a brake engaging force on said brake disc.

5. A differential gear mechanism comprising a power input shaft, a pair of output shafts, said output shafts being axially aligned for rotation about a common axis, a differential carrier, a differential housing rotatably journaling said carrier, a driving connection between said input shaft and said carrier, a pair of differential side gears in said carrier, one side gear being connected to one output shaft and the other side gear being connected to the other output shaft, a pair of differential pinions in said carrier engaging said side gears, an internal disc in said carrier drivably engageable with said pinions, a sleeve shaft surrounding one of said output shafts connected directly to said internal disc, a brake disc connected to said sleeve shaft and extending radially outwardly, a cylinder carried by said differential housing, a piston in said cylinder, a friction surface on said brake disc, and a means for introducing fluid pressure to said cylinder to create a braking force on said friction surface.

6. The combination set forth in claim 4 wherein said brake comprises a pressure plate situated between said disc and said piston, an internal passage in said pressure plate, and means for circulating liquid coolant through said passage to absorb heat developed by braking friction.

7. The combination set forth in claim 5 wherein said brake comprises a pressure plate situated between said disc and said piston, an internal passage in said pressure plate, and means for circulating liquid coolant through said passage to absorb heat developed by braking friction.

References Cited

UNITED STATES PATENTS

| 2,397,374 | 3/1946 | Schlicksupp | 74—711 |
| 2,876,658 | 3/1959 | McColl | 74—710.5 |
| 2,962,916 | 12/1960 | Koelsch | 74—710.5 |
| 3,095,762 | 7/1963 | Baker | 74—710.5 X |

ARTHUR T. McKEON, *Primary Examiner.*